April 29, 1930.  F. G. BROTZ  1,756,810
UPPER BASKET FOR DISHWASHERS
Filed Aug. 12, 1927
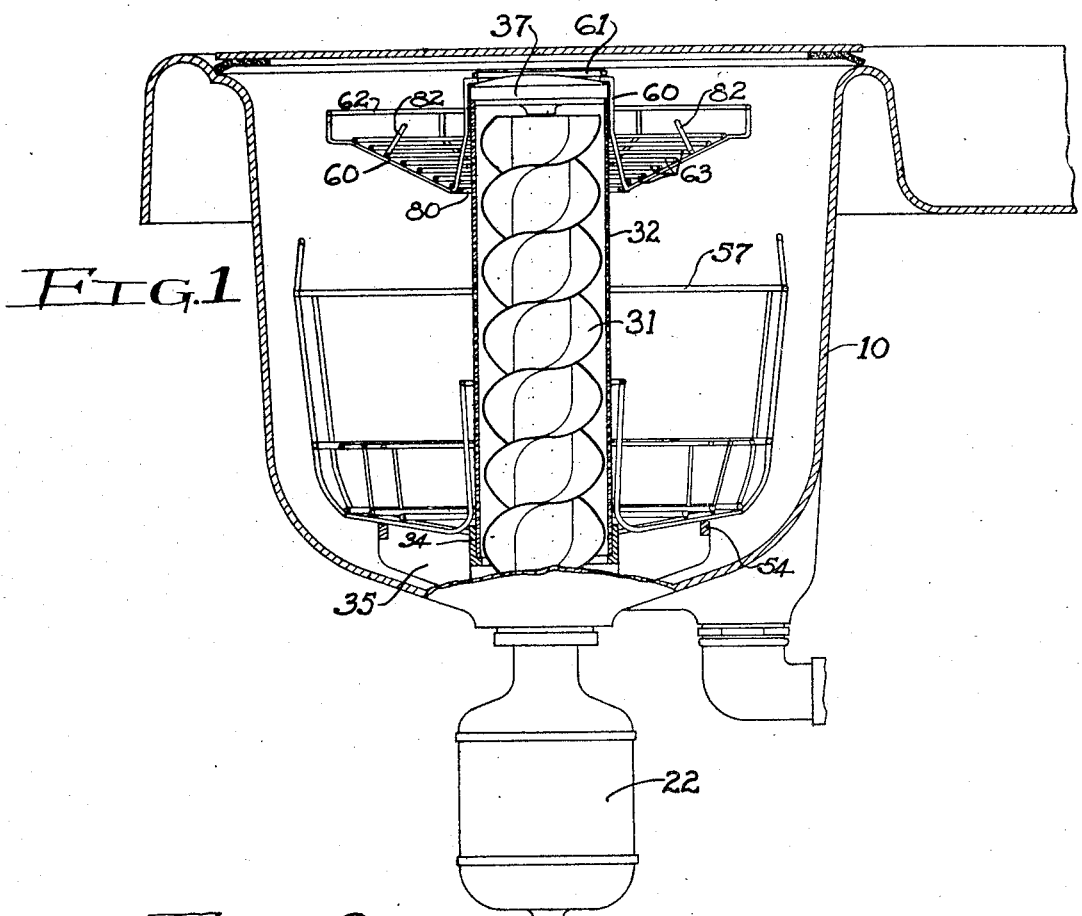
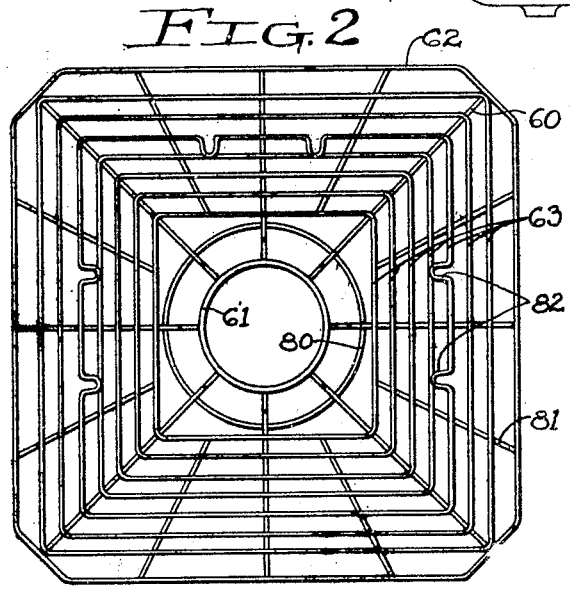
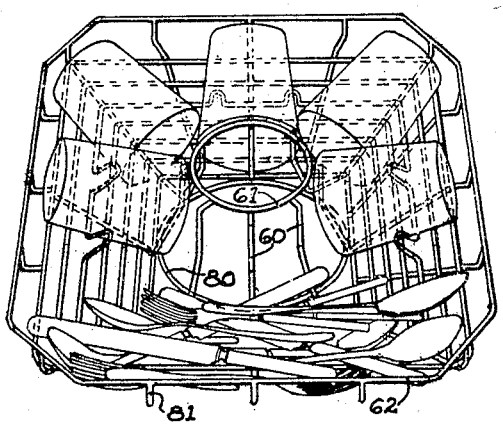
WITNESSES
INVENTOR
Frank G. Brotz
By R. S. Caldwell
ATTORNEY Patented Apr. 29, 1930

1,756,810

UNITED STATES PATENT OFFICE

FRANK G. BROTZ, OF KOHLER, WISCONSIN, ASSIGNOR TO KOHLER COMPANY, OF KOHLER, WISCONSIN, A CORPORATION OF WISCONSIN

UPPER BASKET FOR DISHWASHERS

Application filed August 12, 1927. Serial No. 212,460.

This invention relates to a basket for dishwashers of the type in which the water is forcibly ejected from a central tower or perforated cylinder by means of rapidly rotating screw blades and the object is to provide such a basket that will fit around the cylindrical tower and be properly supported on the upper end thereof for containing glass tumblers, silverware and the like.

Another object of the invention is to provide such a basket with means for engaging the end of the tower in such a manner that the basket may be merely lifted off of the tower for loading and unloading.

Another object of the invention is to provide such a basket that will properly hold the contents either when mounted on the tower or when removed therefrom.

Another object of the invention is to provide such a basket that will hold the contents in a position to best receive the cleaning action of the radially projected jets of water.

Another object of the invention is to make such a basket of wire with the parts so arranged and related as to be strong and durable and to support the weight without bending.

With the above and other objects in view the invention consists of the basket for dishwashers as herein claimed.

Referring to the accompanying drawings in which like characters of reference indicate the same parts in different views, Fig. 1 is a sectional elevation of a dishwashing machine having as its upper basket the basket of the present invention;

Fig. 2 is a plan view of the basket; and

Fig. 3 is a perspective view of the basket loaded with glassware and silverware.

In these drawings 10 indicates a container of a dishwasher having an electric motor 22 mounted on its bottom with its motor shaft extending up through the bottom of the container and carrying a screw 31 surrounded by and closely fitting within a perforated metal cylindrical casing or tower 32 which extends to near the top of the container and is occupied by the screw for substantially its entire length.

In the bottom of the container is a support for the cylindrical casing 32 comprising a ring 34 mounted on radial blades 35 which are provided with cross-pieces 54 at their ends. These blades and their cross-pieces form a support for a lower dish-holding basket 57, which as well as the washing machine proper form the subject-matter of separate applications and for that reason are not shown in detail in the present drawings.

The upper basket is supported on the upper end of the cylindrical casing or tower tube 32 and is for supporting glassware and silverware. It consists of a number of radial wires 60, or wires arranged in radial planes about the axis of the machine, and each extending from a central suspension ring 61 downwardly curving outwardly and then bending outwardly and slightly upwardly and then bending upwardly to join with an outer square wire ring 62. A number of square wire rings 63 connect the radial wires 60 to form the inclined bottom of the basket and all wires are welded together at their intersections.

The central ring 61 is of smaller diameter than the cover plate 37 which fits on the upper end of the cylindrical casing 32 and rests thereon, while the wires 60 embrace the upper end of the cylindrical casing 32 between them. Supported in this manner the upper basket is removable by merely lifting it from the container and is as readily assembled within the container by merely placing it on the end of the cylindrical casing.

The lowermost ring 80 of the bottom of the basket is circular instead of square and upon joining it the radial wires change their direction. The square rings 63 are above the radial wires but the ring 80 is beneath them and it serves with the ring 61 to define the central projection within the basket by means of which the basket is supported on the cylindrical casing. Each of the radial wires makes a rightangular bend shortly after leaving the central ring 61 and also just before joining with the outer ring 62, the first bend serving to permit the wires to closely engage the cylindrical casing and the latter bend serving to give the basket a surrounding upstanding flange effect and to position the outer ring 62 well above the plane of the inclined bottom of the basket where it will serve as a stop to limit the outward and upward movement of glass tumblers when caused to slide by the force of the impact of water jets and so prevent said tumblers from being forced off of the basket.

In addition to the radial wires 60 there are intermediate radial wires 81 which extend from the innermost square wire ring 63 to the outer ring 62. To prevent tumblers from rolling on the inclined bottom of the basket, each inclined face of the basket bottom is provided with upstanding projections 82 extending about normal thereto and preferably consisting of wire loops bent up from one of the rings 63.

The glass tumblers are arranged as shown in Fig. 3, with their open ends innermost to receive jets of water from the cylindrical casing 32 for cleaning them and because of the inclined position in which they are held by the slanting bottom of the basket, they quickly discharge the water so that all water is kept in active operation. The silverware is held on one side of the basket bottom rather indiscriminately but the wire rings are set sufficiently close together to prevent it from falling.

The basket may be loaded in this manner and then placed in position in the container or it may be loaded while positioned on the cylindrical casing, but it serves to efficiently and safely support the glasses and silverware in position for cleaning separate from the dishes and enables them to be carried from place to place.

What I claim as new and desire to secure by Letters Patent is:

1. In combination with a dishwasher of the type having a central tower through which radial jets of water are forcibly ejected, a wire basket comprising an inner or suspension ring of smaller diameter than the end of the tower fitting on the end of the tower and supported thereby, an outer ring, radial wires connecting the two rings and extending from the inner ring outwardly and then downwardly and then upwardly and outwardly to the outer ring, and concentric rings secured to the radial wires to form an inclined basket bottom for supporting glass tumblers and the like radially around the tower in an inclined position.

2. In combination with a dishwasher of the type having a substantially square container with a central tower through which radial jets of water are forcibly ejected, a wire basket comprising an inner or suspension ring of smaller diameter than the end of the tower and removably fitting thereon, an outer ring substantially square, radial wires connecting the two rings and extending from the inner ring outwardly and then downwardly and then outwardly and upwardly to the outer ring, concentric square rings secured to the radial wires and forming an inclined basket bottom for supporting glass tumblers in an inverted inclined position radially around the tower.

In testimony whereof, I affix my signature.

FRANK G. BROTZ.